(12) United States Patent
Lee et al.

(10) Patent No.: US 7,079,351 B2
(45) Date of Patent: Jul. 18, 2006

(54) MAGNETIC TAPE GUIDING DEVICE FOR USE WITH A TAPE TRANSPORT SYSTEM OF A TAPE RECORDER AND METHOD FOR USING THE SAME

(75) Inventors: Seung-woo Lee, Suwon (KR); Bong-joo Kim, Suwon (KR); Do-young Choi, Suwon (KR); Jae-hoon Sim, Suwon (KR); Byeng-bae Park, Goyang (KR); Young-ho Cho, Suwon (KR); Jeong-hyeob Oh, Anyang (KR); Hyeong-seok Choi, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 10/337,880

(22) Filed: Jan. 8, 2003

(65) Prior Publication Data

US 2003/0132331 A1 Jul. 17, 2003

(30) Foreign Application Priority Data

Jan. 17, 2002 (KR) .................................. 2002-2803

(51) Int. Cl.
G11B 15/28 (2006.01)
(52) U.S. Cl. ................................... 360/95; 360/130.21
(58) Field of Classification Search .................. 360/85, 360/95, 130.21, 130.24; 226/190
See application file for complete search history.

(56) References Cited

U.S. PATENT DOCUMENTS 5,117,322 A * 5/1992 Kaeriyama ............. 360/130.24
5,761,788 A 6/1998 Fukuda et al.
5,808,827 A * 9/1998 Kumano et al. .............. 360/85
5,870,240 A * 2/1999 Jun .............................. 360/71
5,963,394 A * 10/1999 Yamabuchi et al. .......... 360/85

FOREIGN PATENT DOCUMENTS

| CN | 1128391 A | 7/1996 |
|----|-----------|--------|
| JP | 52058903 | 5/1977 |
| JP | 56083867 | 7/1977 |
| JP | 58091558 | 5/1983 |
| JP | 64-027068 | 1/1989 |

(Continued)

*Primary Examiner*—Brian E. Miller
(74) *Attorney, Agent, or Firm*—Roylance Abrams Berdo & Goodman LLP

(57) ABSTRACT

An improved magnetic tape guiding device for use with a magnetic tape transport system of a tape recorder and the like, and a method for using the same. The magnetic tape guiding system of the tape recorder transport system has a supply reel pole base assembly having a slant pole with a first guide unit having portions formed at both ends of the slant pole to function as a conventional roller for regulating upward and downward movement of the upper and lower edges of a moving magnetic tape, and a tension pole assembly having a tension pole with a second guide unit having portions formed at both ends of the tension pole to function as a conventional impedance roller for regulating upward and downward movement of the upper and lower edges of the moving magnetic tape. This arrangement can thus achieve 2-dimensional plane-traveling of the magnetic tape while also reducing the number of the parts of the guiding system.

18 Claims, 5 Drawing Sheets

FOREIGN PATENT DOCUMENTS

| | | |
|---|---|---|
| JP | 01078459 | 3/1989 |
| JP | 01191362 | 8/1989 |
| JP | 01205754 | 8/1989 |
| JP | 02-021452 | 1/1990 |
| JP | 03224155 | 10/1991 |
| JP | 08-106686 | 4/1996 |
| JP | 08-138286 | 5/1996 |
| JP | 09022555 | 1/1997 |
| JP | 10021608 | 1/1998 |
| JP | 2000-048435 | 2/2002 |

* cited by examiner

MAGNETIC TAPE GUIDING DEVICE FOR USE WITH A TAPE TRANSPORT SYSTEM OF A TAPE RECORDER AND METHOD FOR USING THE SAME

This application claims benefit under 35 U.S.C. § 119 from Korean Patent Application No. 2002-2803, filed on Jan. 17, 2002, the entire content of which is incorporated herein by reference.

BACKGROUND OF THE INVENTION

1. Field of the Invention

The present invention relates to a guiding system and method for a magnetic tape transport system of a tape recorder. More particularly, the present invention relates to a guiding system and method that is capable of guiding a magnetic tape to the recording drum in a tape recording device, such as a video tape recorder, audio tape recorder, video camcorder or the like, while minimizing vertical movement of the tape without using guiding rollers as in the conventional tape guiding systems, to thus reduce the amount of necessary components.

2. Description of the Related Art

A conventional tape recorder, such as a video tape recorder (VTR), a digital audio tape (DAT), and a camcorder with a deck mechanism, is a device that includes a recording medium, such as a magnetic tape, which is controlled to travel in accordance with a predetermined path in the device to record voice and image information and to reproduce the recorded information.

FIGS. 1 and 2 show a moving deck of a camcorder and a magnetic tape guiding device employed in a conventional camcorder. The recording and reproducing of information of the tape recorder 100 is performed as the magnetic tape 20 contacts a head drum 120. Therefore, the tape recorder 100 has a magnetic tape transport system including a magnetic tape guiding device for guiding the moving magnetic tape 20, for placing the magnetic tape 20 in contact with the head drum when the tape is loaded, and for separating the magnetic tape 20 from the head drum when the tape is unloaded. The tape recorder 100 further includes a driving means for driving each of the elements of the guiding device.

The magnetic tape transport system includes magnetic tape guiding devices 130 and 150 having a plurality of rollers that are movable to be placed at predetermined respective positions of a deck 110 when a tape cassette 10 is loaded and unloaded, and a fixing pole member. A supply reel magnetic tape guiding device 130 includes a tension pole assembly 131 and a pole base assembly 135. A take-up reel magnetic tape guiding device 150 includes a guide pole assembly 157, a pole base assembly 151, a capstan shaft 153, and a pinch roller 155 for guiding the magnetic tape 20 by bringing the magnetic tape 20 into contact with the capstan shaft 153.

Here, the tension pole assembly 131 includes a tension arm 133a that is rotated with a predetermined trajectory within the deck 110 when the tape is loaded and unloaded, a tension pole 133 protruding from a front end of the tension arm 133a, and an impedance roller 132 fixed to deck chassis 111. The tension pole 133 applies a predetermined tension to the moving magnetic tape 20, and the impedance roller 132 regulates the up and down movement of the magnetic tape 20 after the tape passes around the tension pole 133.

The supply reel pole base assembly 135 includes a pole base 135a that is slid along a predetermined trajectory within the deck 110 when the tape is loaded and unloaded, a slant pole 137 protruding from the pole base 135a at a certain angle, and a guiding roller 136 to regulate the upward and downward movement of the magnetic tape 20 as it advances toward the slant pole 137.

As shown in FIG. 3A, in the tape recorder 100 having the supply reel magnetic tape guiding device 130 constructed as above, the magnetic tape 20 is traveling with its upward and downward movement being regulated by the guiding roller 136 and the impedance roller 132. In other words, "2-dimensional plane-traveling" of the magnetic tape 20 is achieved, in which the magnetic tape 20 travels without having a change in the height even though the magnetic tape 20 passes around the head drum 120. Here, the magnetic tape 20 in the dotted-area A of FIG. 3A is shown as declining, not because the magnetic tape 20 is declining in height, but because the magnetic tape 20 is advancing toward the head drum 120 that is protruding frontward.

Throughout the years, there have been increasing demands for more compact-sized tape recorders with improved portability and easier handling for the user, which requires a reduction of parts.

However, because the conventional tape recorder 100 must include the impedance roller 132 and the guiding roller 136 to regulate the upward and downward movement of the moving magnetic tape 20, it requires many parts and working processes. Therefore, not only is the conventional tape recorder 100 disadvantageous in terms of production cost, it is also disadvantageous because it is difficult to manufacture in compact size.

In an attempt to overcome the above shortcomings, a supply reel pole base assembly 135 having only the slant pole 135' and not the guiding roller 136 can be used to guide the movement of the magnetic tape 20 as shown in FIG. 3B. By eliminating guiding roller 136, this arrangement reduces the amount of components in the tape recorder 100. However, this reduction in parts can cause the operability of the tape recorder 100 to deteriorate because the arrangement may allow the magnetic tape 20 to travel 3-dimensionally. That is, the height of the traveling path can change when the magnetic tape 20 passes around the slant pole 135'. In addition, an element should be disposed to guide the magnetic tape 20 when the 3-dimensional traveling of the magnetic tape 20 occurs.

SUMMARY OF THE INVENTION

Accordingly, it is an object of the present invention to provide a magnetic tape guiding device and method for a tape transport system of a tape recorder having an improved structure, which is capable of guaranteeing plane-traveling of the magnetic tape with a minimum number of parts.

The above object of the present invention is substantially realized by providing a magnetic tape guiding device for a tape transport system of a tape recorder according to the present invention, which includes a pair of pole base assemblies to draw out a magnetic tape and push the magnetic tape to a tight contact with a head drum when a cassette tape is loaded, and a tension pole assembly to apply a tension force to the tape by pivoting to a position toward the outside edge of the deck of the tape transport system when the magnetic tape is drawn out. A supply reel pole base assembly of the pair of pole base assemblies comprises a pole base movably disposed in the deck to be slid when the magnetic tape is drawn out, and a slant pole having a first guide unit inclined at the pole base to regulate traveling height by contacting an upper edge and a lower edge of the moving magnetic tape.

The tension pole assembly comprises a tension arm disposed in the deck in order to pivot when the magnetic tape is drawn out, and a second guide unit standing upright at a front end of the tension arm in order to regulate traveling height by contacting with the upper edge and the lower edge of the moving magnetic tape. The magnetic tape travels at a predetermined distance from a bottom of the deck as the traveling height is regulated by the tension pole assembly and the pole base assembly.

The first guide unit includes a sloping guide protrusion disposed at an upper end of the slant pole with an increased external diameter, with the bottom of the sloping guide protrusion being parallel to the bottom of the deck and at a predetermined angle with respect to an upper end of the slant pole. The first guide unit further includes a lower guide protrusion formed at a lower end of the slant pole with an increased external diameter, to regulate a lower direction movement of a lower edge of the magnetic tape.

The sloping angle $\theta_2$ between the lower side of the sloping guide protrusion and the upper end of the slant pole is identical or substantially identical to a sloping angle $\theta_1$ between a vertical line extended from the pole base and a center axis of the slant pole.

The second guide unit includes a guide flange formed at both ends of the tension pole with an increased external diameter.

The second guide unit further includes a sloping side formed between the guide flange and the tension pole.

BRIEF DESCRIPTION OF THE DRAWINGS

The above-mentioned object and the feature of the present invention will be more apparent by describing the preferred embodiment of the present invention by referring to the appended drawings, in which.

DETAILED DESCRIPTION OF THE PREFERRED EMBODIMENTS

Figure 1:
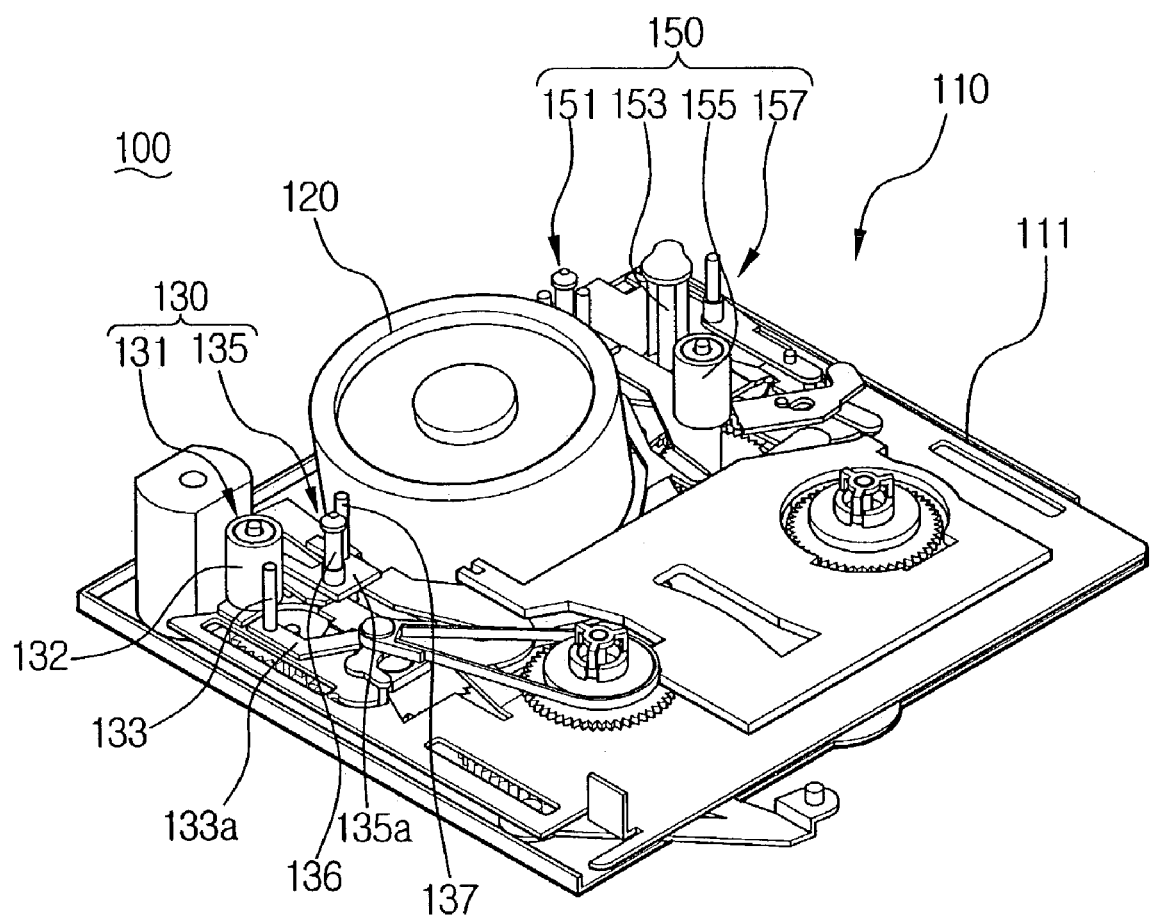
FIG. 1 is a perspective view showing a moving deck of a conventional camcorder.

Hereinbelow, the embodiments of the present invention will be described in greater detail by referring to the appended drawings. The elements having the same function and structure as the conventional elements shown in FIGS. 1 through 3B and described above are given the same reference numerals and are not described in detail below.

Figure 4:
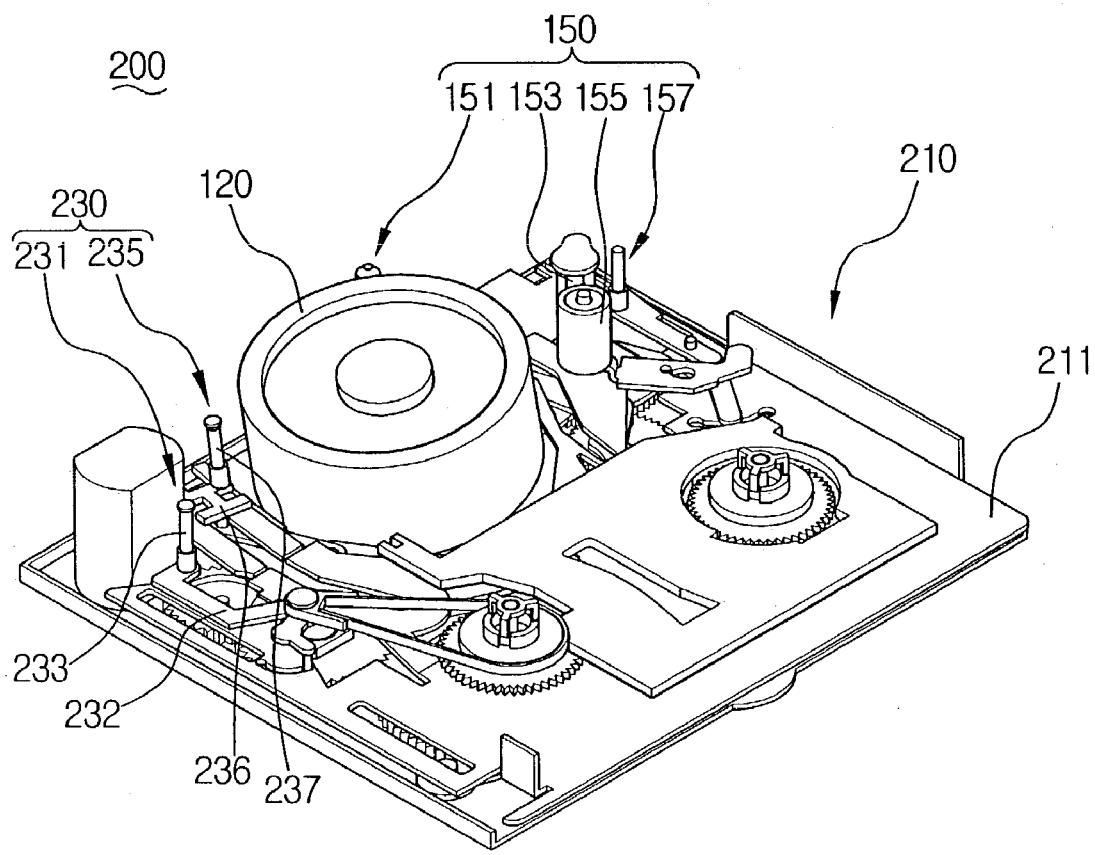
FIG. 4 is a perspective view schematically showing an example of a moving deck of a tape recorder according to an embodiment of the present invention.
Figure 5:
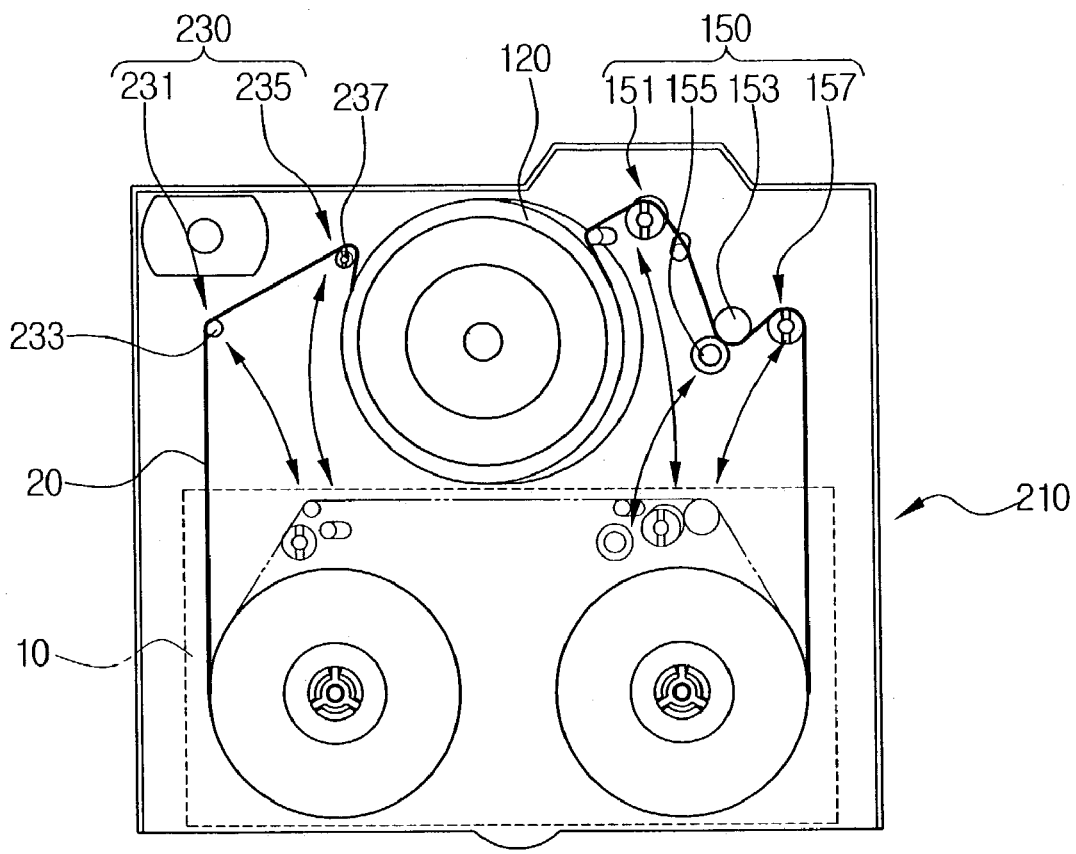
FIG. 5 is a schematic view showing certain elements of the deck shown in FIG. 4 in order to describe a magnetic tape guiding device of the tape recorder according to an embodiment of the present invention.

Referring to FIGS. 4 and 5, a tape recorder 200 according to an embodiment of the present invention has a deck 210 having a magnetic tape transport system including magnetic tape guiding devices 230 and 150, and a driving means to drive and move the elements to a predetermined position. The magnetic tape guiding devices 230 and 150 include a pair of pole base assemblies 235 and 151, respectively, to draw out the magnetic tape 20 from a tape cassette 10 and to push the magnetic tape 20 into tight contact with a head drum 120 when the tape cassette 10 is loaded. The magnetic tape guiding device 230 further includes a tension pole assembly 231 for applying a tension force to the magnetic tape 20 by pivoting away from the tape cassette 10 toward the outside edge of the deck 210 when the magnetic tape 20 is drawn out. The take-up reel magnetic tape guiding device 150 has the same structure as the conventional device 150 discussed above, and thus, no further description will be given here.

Figure 2:
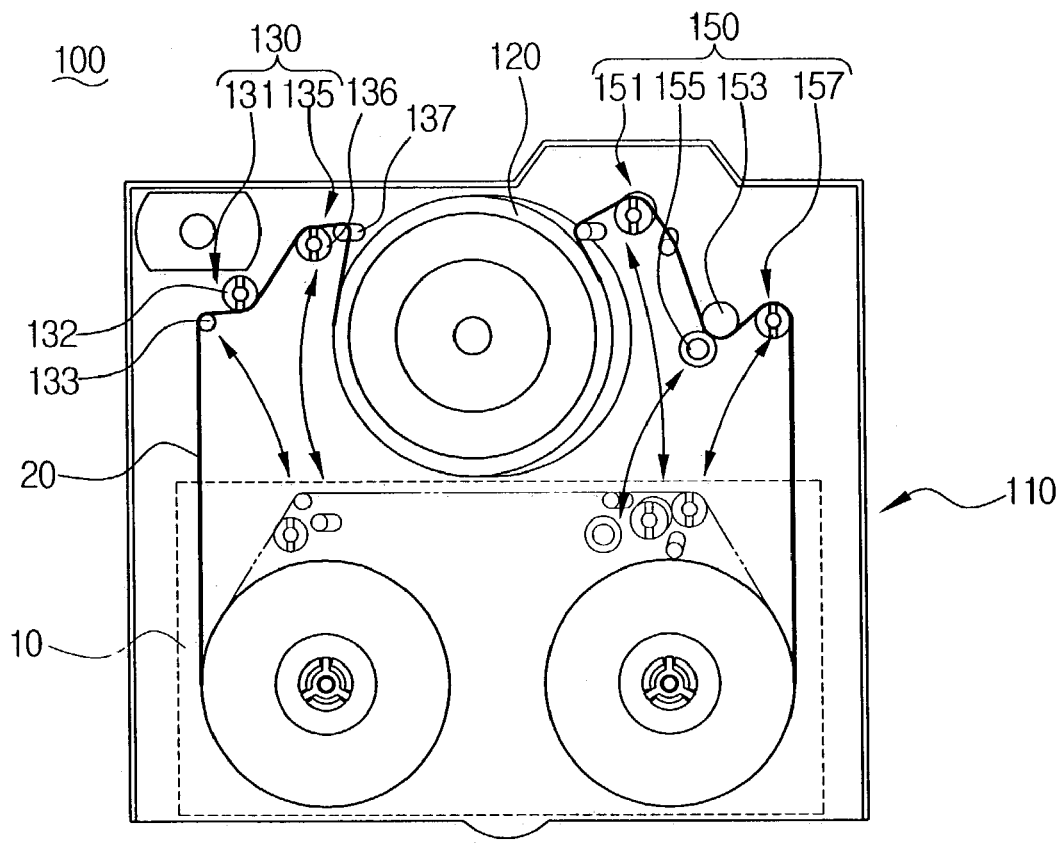
FIG. 2 is a schematic view showing certain elements of the deck shown in FIG. 1 in order to describe a magnetic tape guiding device of a conventional tape recorder.
Figure 3A:
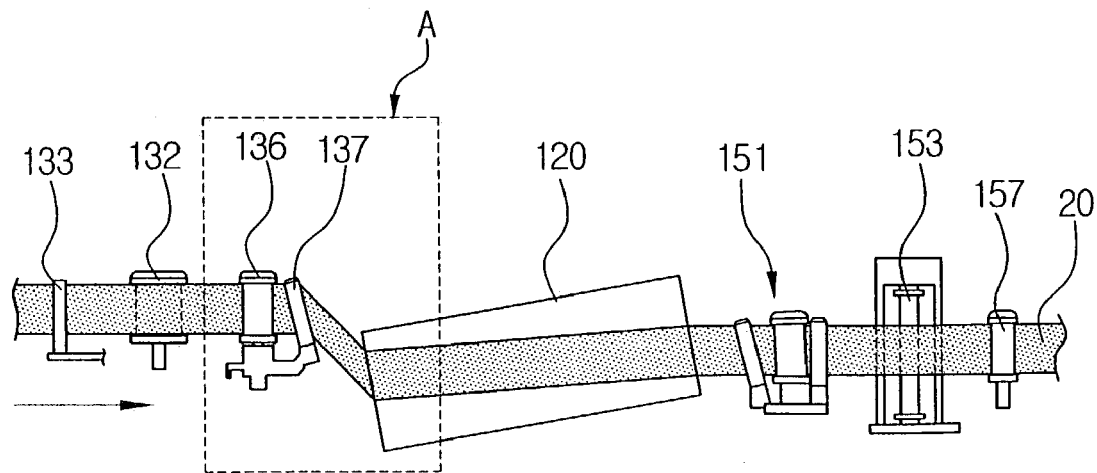
FIGS. 3A and 3B are plan views showing examples of conventional magnetic tape guiding devices.
Figure 3B:
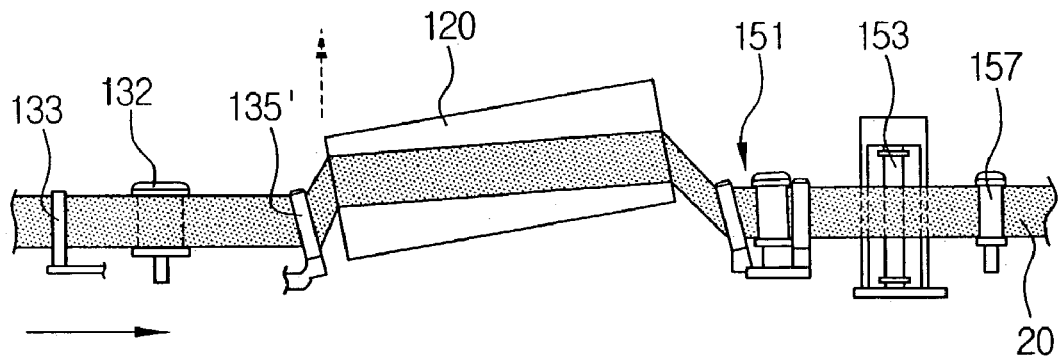
Figure 6:
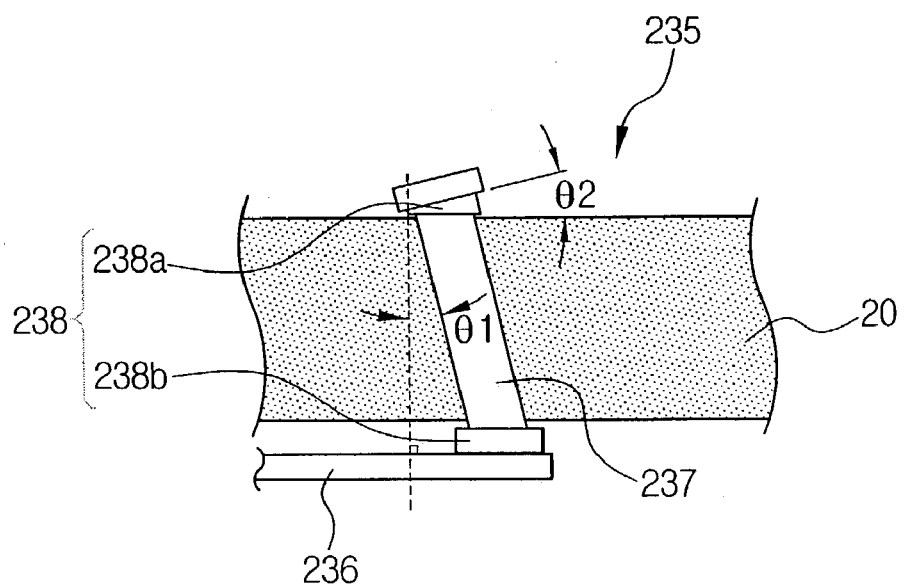
FIG. 6 is a detailed side view schematically showing a portion of a supply reel pole base assembly as shown in FIG. 5.
Figure 7:
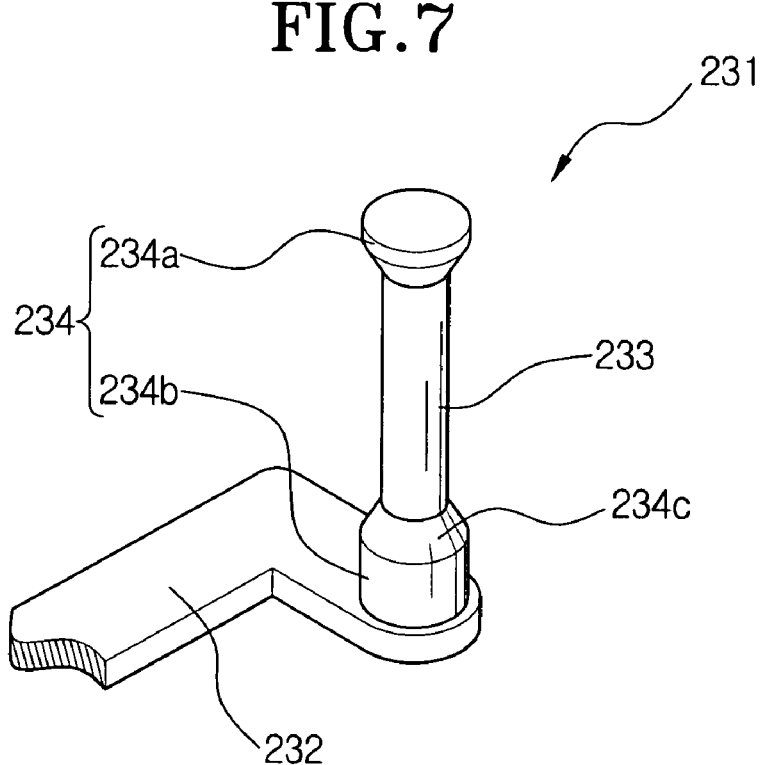
FIG. 7 is a detailed perspective view schematically showing a portion of a tension pole assembly as shown in FIG. 5.

As shown in FIGS. 6 and 7, the conventional guiding roller 136 and the impedance roller 132 shown in FIGS. 1 and 2 are replaced by a slant pole 237 included in the supply reel pole base assembly 235 and a tension pole 233 included in the tension pole assembly 231 in accordance with an embodiment of the present invention, to achieve 2-dimensional plane-traveling of the magnetic tape 20 in the magnetic tape transport system. Accordingly, even in the absence of the conventional guiding roller 136 and the impedance roller 132 as shown in FIG. 1, the magnetic tape 20 travels at a constant or substantially constant distance from the a deck chassis 211 as shown in FIG. 4) without having a change in the height of its traveling path.

Figure 8:
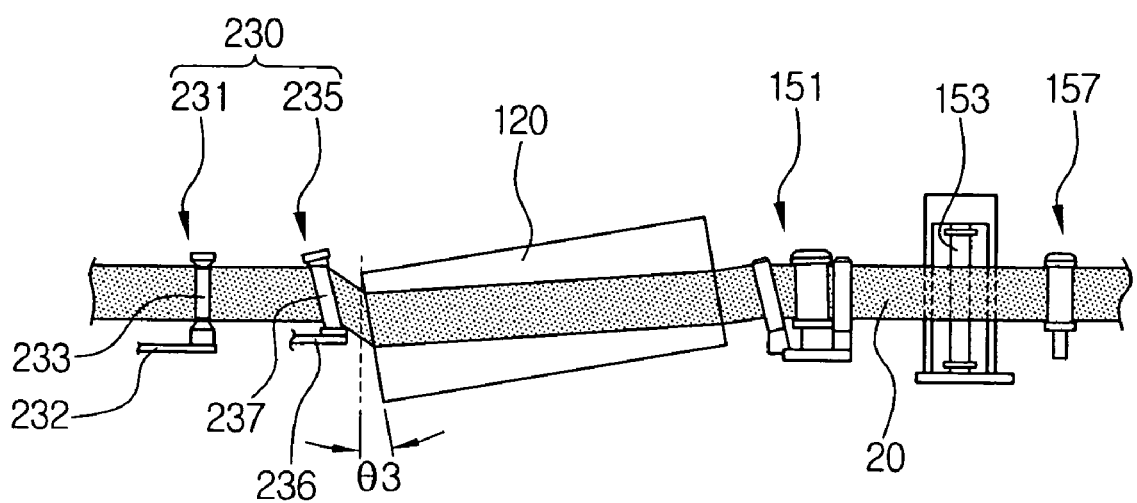
FIG. 8 is a plan view schematically showing an example of the manner in which the tension pole assembly of the tape transport system as shown in FIG. 5 guides the magnetic tape according to an embodiment of the present invention.

More specifically, as shown in FIG. 6, the supply reel pole base assembly 235 includes a pole base 236, a slant pole 237, and a first guide unit 238. The pole base 236 is adapted to be slid to a predetermined position on the deck 210 when the tape cassette 10 is loaded. The slant pole 237 protrudes from the pole base 236 with a predetermined slope at a predetermined angle with respect to a vertical line that is perpendicular to an upper side of the pole base 236. The slant pole has upper and lower ends, and a central portion located between the upper and lower ends. The central portion has a diameter. The first guide unit 238 protrudes from the upper and lower ends of the slant pole 237 at a predetermined slope to regulate upper and lower edges of the moving magnetic tape 20. The first guide unit 238 includes a sloping guide protrusion 238a protruding from an upper end of the slant pole 237 and a lower guide protrusion 238b protruding from a lower end of the slant pole 237. The sloping guide protrusion 238a is formed by increasing an upper external diameter of the slant pole 237 so that the upper external diameter is larger than the diameter of the central portion of the slant pole. In this arrangement, the lower side of the sloping guide protrusion 238a guides the upper edge of the magnetic tape 20 traveling in contact with the slant pole 237 with a certain slope with respect to the slant pole 237. In other words, the magnetic tape 20 is guided to be parallel or substantially parallel to the deck chassis 211 at the bottom of the deck 210. Accordingly, the magnetic tape 20 is guided to travel around the head drum 120 at the same or substantially the same height as the traveling path of the magnetic tape 20 in the interval between the tension pole assembly 231 and the supply reel pole base assembly 235. The sloping angle $\theta_2$ between the lower side of the sloping guide protrusion 238a and the upper end of the slant pole 237 is identical or substantially identical to a sloping angle θ1 between the vertical line extended from the pole base 236 and a center axis of the slant pole 237. In addition, it is preferable that the sloping angle θ2 is identical or substantially identical to an installation sloping angle θ3 of the head drum 120 as shown in FIG. 8.

It can be further understood that the lower guide protrusion 238b is formed at the lower end of the slant pole 237 with an external diameter which is larger than that of the diameter of the central portion of the slant pole 237, to regulate the movement of the lower portion of the magnetic tape 20 when the magnetic tape 20 travels around the slant pole 237. Accordingly, the supply reel magnetic tape guiding device 230 can plane-guide the movement of the magnetic tape 20 advancing to the head drum 120 even in the absence of the guide roller 136 as shown in FIG. 1 due to the configuration of the first guide unit 238 having the sloping guide protrusion 238a and a lower guide protrusion 238b at the upper and lower ends, respectively, of the slant pole 237. In other words, the guide roller 136 shown in FIG. 1 that is used to regulate the upper and lower side of the magnetic tape 20 in the conventional tape recorder 100 can be omitted by instead using the first guide unit 238 disposed at the slant pole 237 to regulate the upper and the lower edges of the moving magnetic tape 20.

Albeit not shown, the supply reel pole base assembly 235 can include a predetermined sloping side formed between the upper end of the traveling lower guide protrusion 238b and the slant pole 237. Accordingly, when the magnetic tape 20 moves to the lower guide protrusion 238b, the sloping side can return the magnetic tape 20 to its initial position without bending the lower edge of the magnetic tape 20. Also, as long the slant pole 237 is present to regulate movement of the upper and the lower edges of the magnetic tape 20, the supply reel pole base assembly 235 can be modified in various other ways.

Details of the tension pole assembly 231 will now be discussed with regard to FIG. 7. The tension pole assembly 231 includes a tension arm 232 that is rotated in the direction as shown in FIG. 5 when the tape is loaded, a tension pole 233 protruding upright from a leading end of the tension arm 232, and a second guide unit 234 formed at an upper end a lower end of the tension pole 233 in order to regulate the upper and the lower edges of the magnetic tape 20. The second guide unit 234 includes a first and a second guide flange 234a and 234b formed at both ends of the tension pole 233 and having increased external diameters as shown. The upward and downward movement of the magnetic tape 20 moving in contact with the tension pole 233 is regulated by the second guide unit 234, and thus, the conventional impedance roller 132 as shown in FIG. 1 can be omitted. In other words, because the tension pole 233 can perform the functions of the conventional tension pole 133 as shown in FIG. 1 and the impedance roller, the impedance roller is not necessary.

In addition, a sloping side 234c having a predetermined sloping angle is formed between the second guide flange 234a and 234b and the tension pole 233. Accordingly, even through the magnetic tape 20 can have a tendency to move up and down due to an abnormal movement, the sloping side 234c can return the magnetic tape 20 to its initial position. Furthermore, as long as the tension pole 233 exists to limit the upward and downward movement of the magnetic tape 20 when the magnetic tape 20 travels, the supply reel tension pole assembly 231 can be modified in various way as can be appreciated by one skilled in the art.

FIG. 8 is a plan view showing the magnetic tape transport system including the supply reel pole base assembly 235 and the tension pole assembly 231 along the magnetic tape traveling path as discussed above. It can be easily seen from FIG. 8 that the magnetic tape 20 travels such that 2-dimensional plane-traveling is secured as in the conventional system discussed above. As explained above with regard to the illustration in FIG. 3A, the portion of the magnetic tape 20 between the slant pole 237 and the head drum 120 is not actually declining in height, but is advancing toward the head drum 120 that is protruding frontward.

The magnetic tape transport system of the tape recorder 200 described above can be employed in a video camcorder, as well as in a video tape recorder (VCR) and a digital audio tape (DAT) tape recorder having a deck mechanism.

According to the embodiments of the present invention described above, the number of the parts of the magnetic tape transport system, especially in the supply reel pole base assembly 235 and the tension pole assembly 231, can be reduced, while still achieving secured plane-movement of the magnetic tape 20. In other words, the fixing poles 237 and 233 enable the magnetic tape 20 to plane-travel as does the conventional magnetic tape without requiring the two rollers 132 and 136 of the conventional supply reel magnetic tape guiding device 130 as shown in FIG. 1.

As the elements are reduced, the manufacturing process of the tape recorder 200 is simplified. In addition, the production cost is also reduced, and a smaller tape recorder 200 can be produced.

Although the preferred embodiments of the present invention have been described, it will be understood by those skilled in the art that the present invention should not be limited to the described preferred embodiments, but various changes and modifications can be made within the spirit and the scope of the present invention. Accordingly, the scope of the present invention is not limited within the described range but the following claims.

What is claimed is:

1. A magnetic tape guiding device for a transport system of a tape recorder, comprising a pair of pole base assemblies adapted to draw out a magnetic tape and push the magnetic tape to a tight contact with a head drum when a cassette tape is loaded, the magnetic tape guiding device comprising:

a tension pole assembly, adapted to apply a tension force to the magnetic tape by pivoting toward an outside edge of a deck of the transport system when the magnetic tape is drawn out; and a supply reel pole base assembly, included in one of the pair of pole base assemblies, and comprising a pole base movably disposed on the deck to be slid when the magnetic tape is drawn out, and a slant pole including a portion angled with respect to the pole base, the slant pole having a central portion with a diameter and a first guide unit to regulate traveling height by contacting an upper edge and a lower edge of the moving magnetic tape, the first guide unit including a sloping guide protrusion disposed at an upper end of the slant pole with an external diameter larger than the diameter of the central portion of the slant pole, the sloping guide protrusion having a lower side that extends at a predetermined sloping angle θ2 with respect to the top edge of the slant pole, the lower side of the sloping guide protrusion being substantially parallel to a surface of the deck, wherein the tension pole assembly comprises a tension arm disposed in the deck to pivot when the magnetic tape is drawn out, and a tension pole extending upright at a front end of the tension arm, the tension pole having a second guide unit to regulate traveling height by contacting the upper edge and the lower edge of the moving magnetic tape, and the magnetic tape travels at a predetermined distance from a surface of the deck as the traveling height is regulated by the tension pole assembly and the pole base assembly.

2. The magnetic tape guiding device of claim 1, wherein the first guide unit further includes:

a lower guide protrusion, formed at a lower end of the slant pole and having an external diameter larger than that of the diameter of the central portion of the slant pole, and being adapted to regulate a lower direction movement of a lower edge of the magnetic tape.

3. The magnetic tape guiding device of claim 1, wherein the second guide unit includes a respective guide flange formed at each end of the tension pole with an external diameter larger than that of the tension pole.

4. The magnetic tape guiding device of claim 3, wherein the second guide unit includes a sloping side formed between each said guide flange and the tension pole.

5. A magnetic tape guiding device for a transport system of a tape recorder, comprising a pair of pole base assemblies adapted to draw out a magnetic tape and push the magnetic tape to a tight contact with a head drum when a cassette tape is loaded, the magnetic tape guiding device comprising:

a tension pole assembly, adapted to apply a tension force to the magnetic tape by pivoting toward an outside edge of a deck of the transport system when the magnetic tape is drawn out; and a supply reel pole base assembly, included in one of the pair of pole base assemblies, and comprising a pole base movably disposed on the deck to be slid when the magnetic tape is drawn out, and a slant pole including a portion angled with respect to the pole base, the slant pole having a central portion with a diameter and a first guide unit to regulate traveling height by contacting an upper edge and a lower edge of the moving magnetic tape, the first guide unit including a sloping guide protrusion disposed at an upper end of the slant pole with an external diameter larger than the diameter of the central portion of the slant pole, the sloping guide protrusion having a lower side that extends at a predetermined sloping angle $\theta 2$ with respect to the top edge of the slant pole, the predetermined sloping angle $\theta 2$ being substantially identical to a sloping angle $\theta 1$ between a vertical line extended from the pole base and a center axis of the slant pole, the first guide unit also including a lower guide protrusion, formed at a lower end of the slant pole and having an external diameter larger than that of the diameter of the central portion of the slant pole, and being adapted to regulate a lower direction movement of a lower edge of the magnetic tape, wherein the tension pole assembly comprises a tension arm disposed in the deck to pivot when the magnetic tape is drawn out, and a tension pole extending upright at a front end of the tension arm, the tension pole having a second guide unit to regulate traveling height by contacting the upper edge and the lower edge of the moving magnetic tape, and the magnetic tape travels at a predetermined distance from a surface of the deck as the traveling height is regulated by the tension pole assembly and the pole base assembly.

6. The magnetic tape guiding device of claim 5, wherein the lower side of the sloping guide protrusion is substantially parallel to a surface of the deck.

7. A method for guiding a magnetic tape in a tape transport system of a tape recorder comprising a pair of pole base assemblies adapted to draw out a magnetic tape and push the magnetic tape to a tight contact with a head drum when a cassette tape is loaded, one of the pole base assemblies including a supply reel pole base assembly comprising a pole base movably disposed on a deck of the transport system and a slant pole including a portion angled with respect to the pole base, the slant pole having a central portion with a diameter and a first guide unit including a sloping guide protrusion disposed at an upper end of the slant pole with an external diameter larger than the diameter of the central portion of the slant pole, and having a lower side that is substantially parallel to a surface of the deck and which extends at a predetermined sloping angle $\theta 2$ with respect to the top edge of the slant pole, and the transport system further including a tension pole assembly comprising a tension arm and a tension pole extending upright at a front end of the tension arm, the tension pole having a second guide unit, the method comprising:

moving the supply reel pole base assembly when the magnetic tape is drawn out to enable the first guide unit of the slant pole to contact an upper edge and a lower edge of the magnetic tape to regulate transport height of the magnetic tape; and moving the tension arm to move the tension pole assembly toward an outside edge of the deck when the magnetic tape is drawn out to apply a tension force to the magnetic tape and to enable the second guide unit to contact the upper edge and the lower edge of the moving magnetic tape to regulate transport height of the magnetic tape, so that the magnetic tape travels at a predetermined distance from a surface of the deck as the traveling height is regulated by the tension pole assembly and the pole base assembly.

8. The method of claim 7, wherein the first guide unit further includes:

a lower guide protrusion, formed at a lower end of the slant pole and having an external diameter larger than that of the diameter of the central portion of the slant pole; and wherein the supply reel pole base assembly moving step includes positioning the sloping guide protrusion to regulate an upper direction movement of an upper edge of the magnetic tape, and positioning the lower guide protrusion to regulate a lower direction movement of a lower edge of the magnetic tape.

9. The method of claim 8, wherein the predetermined sloping angle $\theta 2$ is substantially identical to a sloping angle $\theta 1$ between a vertical line extended from the pole base and a center axis of the slant pole.

10. The method of claim 7, wherein:

the second guide unit includes a respective guide flange formed at both ends of the tension pole with an external diameter larger than that of the tension pole; and wherein the tension arm moving step includes positioning the guide flanges to regulate an upper direction of movement of an upper edge of the magnetic tape and a lower direction of movement of the lower edge of the magnetic tape.

11. The method of claim 10, wherein the second guide unit includes a sloping side formed between each said guide flange and the tension pole.

12. An apparatus for guiding magnetic tape in a tape recorder, comprising:

a deck;

a tension pole assembly movably disposed on the deck, the tension pole assembly comprising a tension arm movably disposed on the deck to apply tension to the magnetic tape, a tension pole extending from a front end of the tension arm, and a tension guide unit for regulating the traveling height of the magnetic tape;

a supply reel pole base assembly disposed on the deck, the supply reel pole base assembly comprising a pole base movably disposed on the deck, and a slant pole having upper and lower ends and a central portion having a diameter, the slant pole including a portion angled with respect to the pole base;

a first guide disposed at the upper end of the slant pole, the first guide having an external diameter larger than the diameter of the central portion of the slant pole and a lower side that extends at a predetermined sloping angle $\theta 2$ with respect to the top edge of the slant pole, the lower side of the first guide being substantially parallel to the surface of the deck; and a second guide disposed at the lower end of the slant pole, the second guide having an external diameter larger than the diameter of the central portion of the slant pole.

13. An apparatus for guiding magnetic tape in a tape recorder according to claim 12, wherein the first and second guides are guide flanges.

14. An apparatus for guiding magnetic tape in a tape recorder according to claim 12, wherein the tension pole has upper and lower ends and a diameter, and the tension guide unit comprises first and second guide flanges disposed at the upper and lower ends of the tension pole, respectively.

15. An apparatus for guiding magnetic tape in a tape recorder according to claim 12, wherein the tension guide unit of the tension pole assembly comprises first and second guide flanges formed at both ends of the tension pole.

16. An apparatus for guiding magnetic tape in a tape recorder according to claim 15, wherein sloping sides are formed between the first and second guide flanges and the tension pole.

17. An apparatus for guiding magnetic tape in a tape recorder, comprising:

a deck;

a tension pole assembly movably disposed on the deck, the tension pole assembly comprising a tension arm movably disposed on the deck to apply tension to the magnetic tape, a tension pole extending from a front end of the tension arm, and a tension guide unit for regulating the traveling height of the magnetic tape;

a supply reel pole base assembly disposed on the deck, the supply reel pole base assembly comprising a pole base movably disposed on the deck, and a slant pole having upper and lower ends and a central portion having a diameter, the slant pole being at an angle $\theta 1$ with respect to vertical;

a first guide disposed at the upper end of the slant pole, the first guide having an external diameter larger than the diameter of the central portion of the slant pole and a lower side that extends at a predetermined sloping angle $\theta 2$ with respect to the top edge of the slant pole, the predetermined sloping angle $\theta 2$ is substantially the same as $\theta 1$; and a second guide disposed at the lower end of the slant pole, the second guide having an external diameter larger than the diameter of the central portion of the slant pole.

18. An apparatus for guiding magnetic tape in a tape recorder, comprising:

a deck;

a tension pole assembly movably disposed on the deck, the tension pole assembly comprising a tension arm movably disposed on the deck to apply tension to the magnetic tape, a tension pole extending from a front end of the tension arm, and a tension guide unit for regulating the traveling height of the magnetic tape;

a supply reel pole base assembly disposed on the deck, the supply reel pole base assembly comprising a pole base movably disposed on the deck, and a slant pole having upper and lower ends and a central portion having a diameter, the slant pole including a portion angled with respect to the pole base;

a first guide disposed at the upper end of the slant pole, the first guide having an external diameter larger than the diameter of the central portion of the slant pole and a lower side that extends at a predetermined sloping angle $\theta 2$ with respect to the top edge of the slant pole;

a second guide disposed at the lower end of the slant pole, the second guide having an external diameter larger than the diameter of the central portion of the slant pole; and a head drum installed on the deck at an angle $\theta 3$ which is substantially the same as the predetermined sloping angle $\theta 2$ of the lower side of the first guide.

* * * * *